United States Patent
Crane (10) Patent No.: US 6,407,888 B1
(45) Date of Patent: Jun. 18, 2002

(54) TRANSVERSE SLOT MOUNTING OF HEAD/GIMBAL SUSPENSION ASSEMBLIES IN DISC DRIVES

(75) Inventor: Peter Crane, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/307,088

(22) Filed: May 7, 1999

Related U.S. Application Data
(60) Provisional application No. 60/084,808, filed on May 7, 1998.

(51) Int. Cl.$^7$ .............................................. G11B 21/26
(52) U.S. Cl. ................................................... 360/244.5
(58) Field of Search ........................... 360/244.5, 244.2, 360/244.3, 244.8, 244.9, 245.1, 245.4, 245.5, 246.4

(56) References Cited

U.S. PATENT DOCUMENTS

| | | | |
|---|---|---|---|
| 5,142,424 A | * 8/1992 | Hatamura ................ | 360/244.2 |
| 5,331,489 A | * 7/1994 | Johnson et al. .......... | 360/245.6 |
| 5,428,490 A | * 6/1995 | Hagen ..................... | 360/245.5 |
| 5,731,932 A | * 3/1998 | Crane ...................... | 360/244.5 |
| 5,781,380 A | * 7/1998 | Berding et al. .......... | 360/264.2 |
| 5,894,655 A | * 4/1999 | Symons ................... | 29/603.04 |
| 6,005,750 A | * 12/1999 | Willard et al. ........... | 360/244.8 |

\* cited by examiner

Primary Examiner—David L. Ometz
Assistant Examiner—Tianjie Chen
(74) Attorney, Agent, or Firm—Westman, Champlin & Kelly, P.A.

(57) ABSTRACT

A system for mounting head suspensions to actuator head mounting arms in a disc drive. The mounting system includes transverse features in the distal ends of the actuator head mounting arms that cooperate with appropriately formed mounting features welded to or cooperative with the head suspensions. To minimize the effects of dimensional tolerance extremes, the head suspension mounting system includes horizontal slots in the actuator head mounting arms, extending from the transverse features at the distal ends of the actuator head mounting arms back toward the actuator pivot, which serve to vertically divide each actuator head mounting arm into a pair of cooperative cantilever beams, or spring elements. Various embodiments of the transverse features and cooperative mounting features on the head suspension, as well as variations for mounting single head suspensions at the top and bottom of an array of head suspensions, are disclosed.

20 Claims, 9 Drawing Sheets

TRANSVERSE SLOT MOUNTING OF HEAD/GIMBAL SUSPENSION ASSEMBLIES IN DISC DRIVES

CROSS-REFERENCE TO RELATED APPLICATIONS

This Application claims the benefit of U.S. Provisional Application Serial No. 60/084,808, filed May 7, 1998.

BACKGROUND OF THE INVENTION

This invention relates generally to the field of disc drive data storage devices, and more particularly, but not by way of limitation, to a system for mounting head/head suspension assemblies to actuator arms in a disc drive.

Disc drives of the type referred to as "Winchester" disc drives, or hard disc drives, are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speed of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning disc to fly the head assembly in a closely spaced relationship to the disc surface.

In order to maintain the proper flying relationship between the head assemblies and the discs, the head assemblies are attached to and supported by head suspensions, or flexures.

A typical head suspension includes four integrally formed portions: 1) a mounting portion, for attaching the head suspension to the actuator used to move the heads from track to track; 2) a spring portion, to provide a counterbalancing force to balance the hydrodynamic lifting force of the slider and to maintain consistent flying height of the head; 3) a rigid beam portion for transferring the counterbalancing force of the spring portion to the head assembly; and 4) a gimbal portion, to which the head assembly is attached, which is compliant in the head assembly's roll and pitch axes to allow the slider to follow minor variations in the flatness of the discs, and stiff in the head assembly's yaw and in-plane axes, to permit accurate positioning of the head relative to the data tracks.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and heads, in accordance with the well-known Lorentz relationship. As the actuator bearing housing rotates, the heads are moved radially across the data tracks along an arcuate path.

The head suspensions described above are typically fabricated from full hardened 300 series stainless steel foil, with flexures of the current generation being formed from flat stainless steel stock 0.0025 inches thick. A typical head suspension which could be modified in conformance with the present invention is described in detail in U.S. Pat. Nos. 5,428,490 and 5,331,489, both assigned to the assignee of the present invention and incorporated herein by reference as if included herein in their entireties.

As noted in the incorporated references, since the head suspensions are typically formed of relatively weak material, and, since the attachment of the head suspensions to the actuator assembly must be very strong and rigid, the head suspension assemblies typically include mounting plates, contiguous to the mounting portions of the head suspensions, to stiffen the mounting portions and allow for strong mechanical connection of the head suspension to the actuator assembly. These mounting plates are commonly formed of stainless steel having a thickness of approximately 0.008 inches.

Several different attachment systems have historically been used to connect the head suspensions with mounting plates to actuator arms, including rivets (U.S. Pat. No. 4,783,710, to Salyer, et al.), machine screws, adhesives and swaging (U.S. Pat. No. 5,262,911, to Eckerd, et al.). The two immediately preceding noted patents are also assigned to the assignee of the present invention and are also incorporated herein by reference. Each of these prior art head suspension mounting systems has its own particular drawbacks, including limitations on interdisc spacing (machine screws), contamination of assembly fixtures (adhesives), additional component costs (screws, swaging) and convenience of rework (rivets, swaging).

U.S. Pat. No. 5,731,932, issued Mar. 24, 1998, to Crane, et al., also assigned to the assignee of the present invention and incorporated herein by reference, discloses a system for mounting head suspensions that includes the use of a transverse hole and slot arrangement in the distal ends of head mounting arms of actuator assemblies, and cooperatively formed head suspension mounting portions. The teaching of the '932 reference overcomes many of the drawbacks of the prior art head suspension mounting systems, and also reduces the amount of moving mass in the actuator, by excluding the mass of the previously mentioned mounting plates. It has been found, however, that the head suspension mounting system of the '932 reference also includes limitations in implementation. In particular, dimensional tolerance variation in the mounting features of the actuator head mounting arms and the thickness of the head suspension materials can lead to either excessive stresses in the materials of the actuator head mounting arms or reduced mounting strength.

The present invention is an improvement on the head suspension mounting system of the '932 reference, that combines the advantages noted therefor with elimination of the disadvantages noted.

SUMMARY OF THE INVENTION

The present invention is a system for mounting head suspensions to actuator head mounting arms in a disc drive.

The mounting system includes transverse features in the distal ends of the actuator head mounting arms that cooperate with appropriately formed mounting features welded to or cooperative with the head suspensions. To minimize the effects of dimensional tolerance extremes, the head suspension mounting system includes horizontal slots in the actuator head mounting arms, extending from the transverse features at the distal ends of the actuator head mounting arms back toward the actuator pivot, which serve to vertically divide each actuator head mounting arm into a pair of cooperative cantilever beams, or spring elements. Various embodiments of the transverse features and cooperative mounting features on the head suspension, as well as variations for mounting single head suspensions at the top and bottom of an array of head suspensions, are disclosed.

The features, benefits and advantages of the present invention can best be understood from a review of the following DETAILED DESCRIPTION OF THE INVENTION, when read in conjunction with an examination of the accompanying drawings.

DETAILED DESCRIPTION OF THE INVENTION

Figure 1:
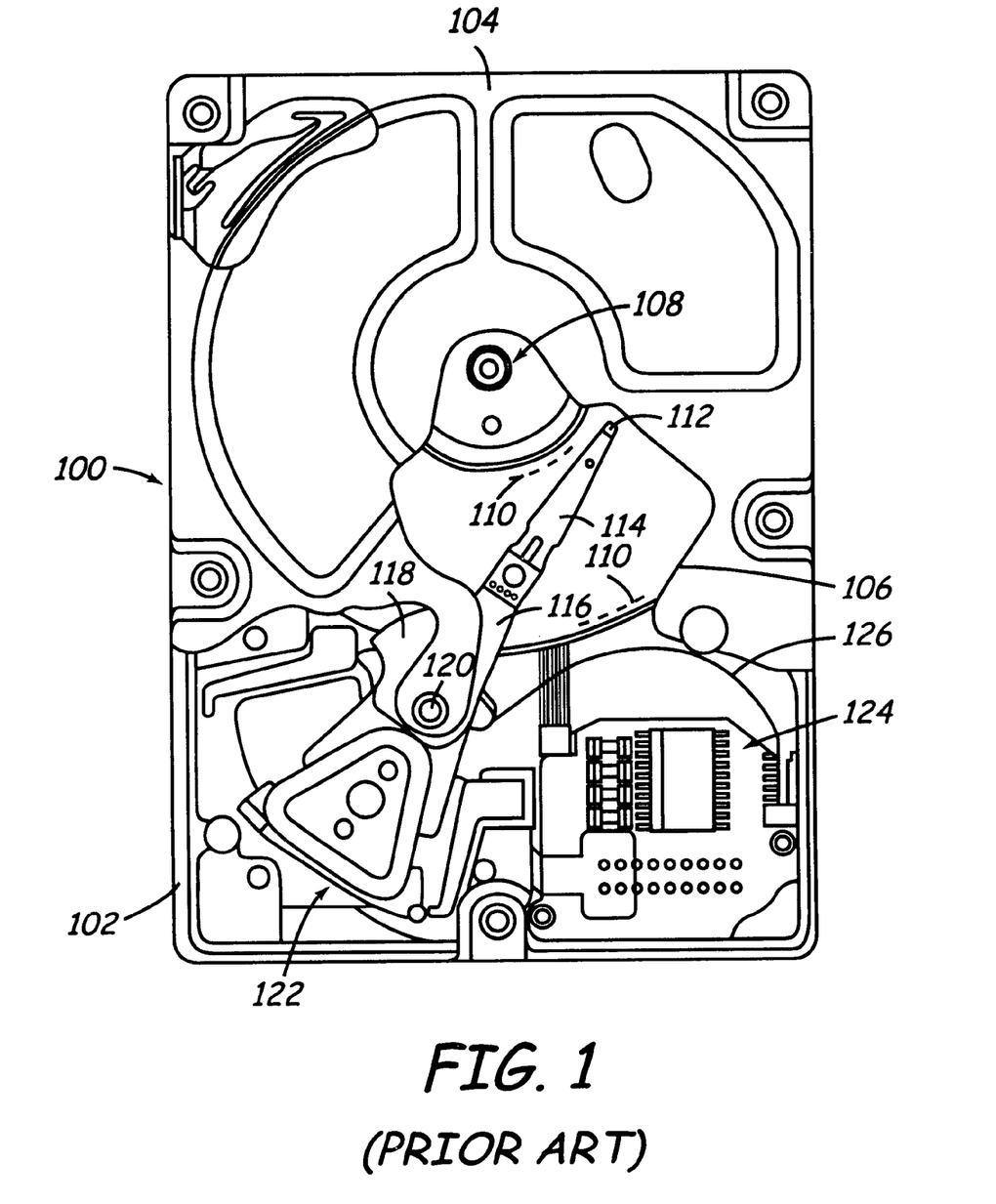
FIG. 1 is a plan view of a prior art disc drive in which the present invention is particularly useful.

Turning now to the drawings and specifically to FIG. 1, shown is a plan view of a disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes one or more disc 106 which are mounted for rotation on a spindle motor shown generally at 108. The disc 106 include on their surfaces a plurality of circular, concentric data tracks, the innermost and outermost of which are shown by dashed lines at 110, on which data are recorded via an array of vertically aligned heads (one of which is shown at 112). The heads 112 are supported by head suspensions, or flexures 114, which are attached to actuator head mounting arms 116. The actuator head an array of ball bearing assemblies (not designated) for rotation about a pivot shaft 120. Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

Figure 2:
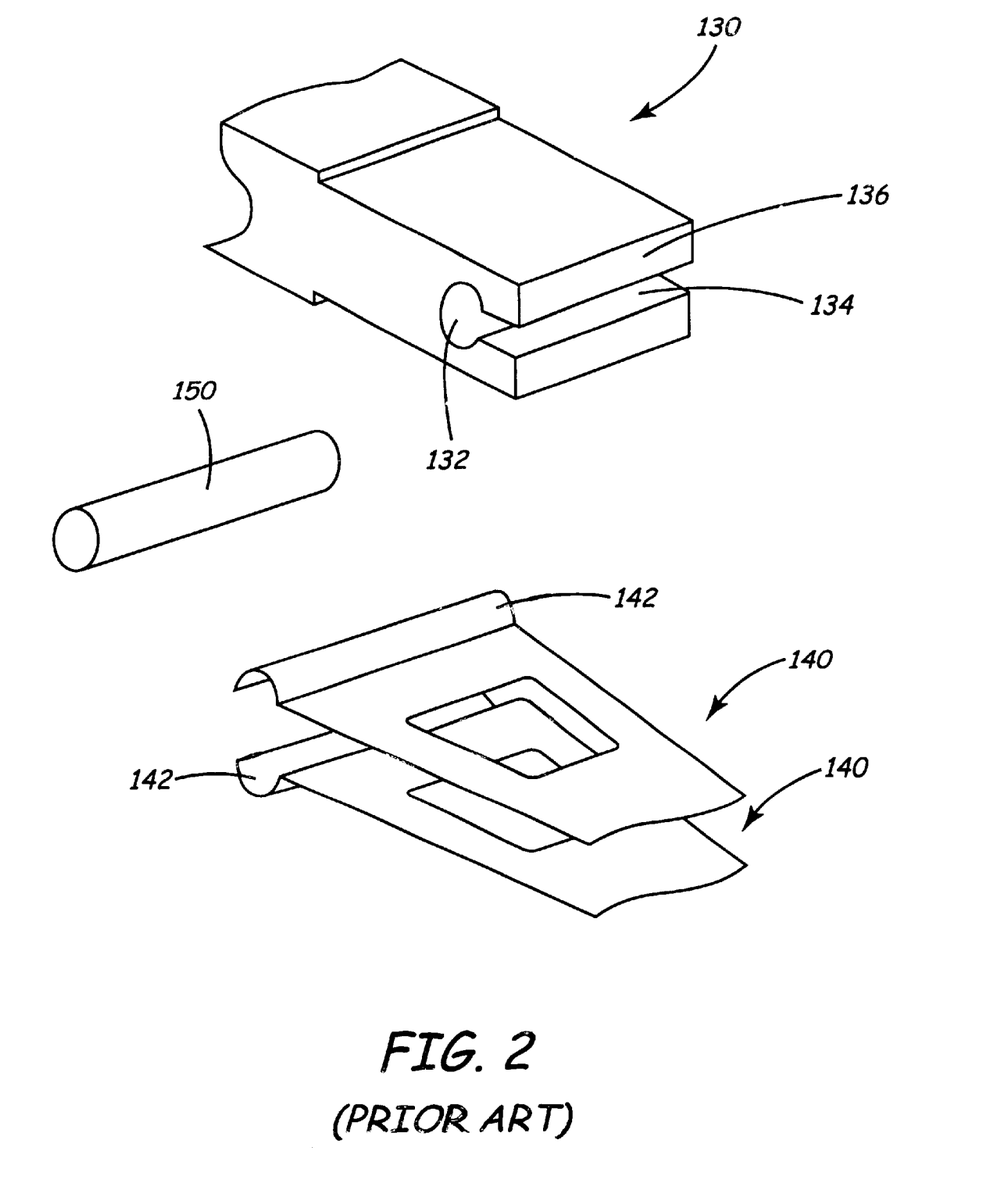
FIG. 2 is an exploded isometric view of components of a prior art head suspension mounting system.

FIG. 2 is an exploded isometric view of the principal components of the head suspension mounting system of the previously incorporated '932 patent. Specifically, FIG. 2 shows the distal end of a head mounting arm 130 which includes a transverse hole 132 connected to a transverse slot 134 communicating with the far distal surface 136 of the actuator head mounting arm 130.

FIG. 2 also shows portions of a pair of head suspensions 140 formed at their mounting portions 142 into substantially semi-cylindrical shapes, and a pin member 150.

As fully disclosed in the '932 patent, mounting of the head suspensions 140 is accomplished by placing the pair of head suspensions 140 into back-to-back relationship, as shown, such that the substantially semi-cylindrical mounting portions 142 form an open cylinder. The pin member 150 is then inserted into the cylinder formed by the mounting portions 142 of the head suspensions 140, and the head suspensions 140 and pin member 150 are then laterally inserted into the transverse hole 132 in the end of the actuator head mounting arm 130 with the head suspensions extending distally through the transverse slot 134. The '932 patent also disclosed the use of a dummy channel with a single head suspension 140 for use on the uppermost and lowermost actuator head mounting arm in a disc drive.

Also disclosed in the '932 patent were various embodiments of mechanisms to ensure that the mounting of the head suspensions 140 to the actuator head mounting arm 130 was secure, with the simplest of these mechanisms being an arrangement of interference fits between related components.

Implementation of the '932 patent, however, lead to the discovery that extremes of dimensional tolerances of the components caused either excessive stress on the material of the actuator head mounting arm 130, or insufficient mounting force applied to the head suspensions 140 to provide a secure and reliable mounting. For instance, if the diameter of the transverse hole 132 was at the lower end of its dimensional tolerance range, and the thickness of the material of the head suspensions 140 and the diameter of the pin member 150 were at the upper limits of their associated dimensional tolerance ranges, the stresses introduced locally in the area of the transverse hole 132 were found to be on the order of five times the yield stress of typical actuator head mounting arm material, such as 6061-T6 aluminum alloy.

Conversely, if the diameter of the transverse hole 132 was at the upper limit of its dimensional tolerance range, while the thickness of the material of the head suspensions 140 and the diameter of the pin member 150 were at the lower limits of their associated dimensional tolerance ranges, the interference fit between components might not be strong enough to ensure adequate mounting rigidity of the head suspensions 140, particularly in the presence of a specified range of mechanical shocks applied to the disc drive.

It was this difficulty with dimensional tolerance variations and overall system requirements that lead to the present invention.

Figure 3:
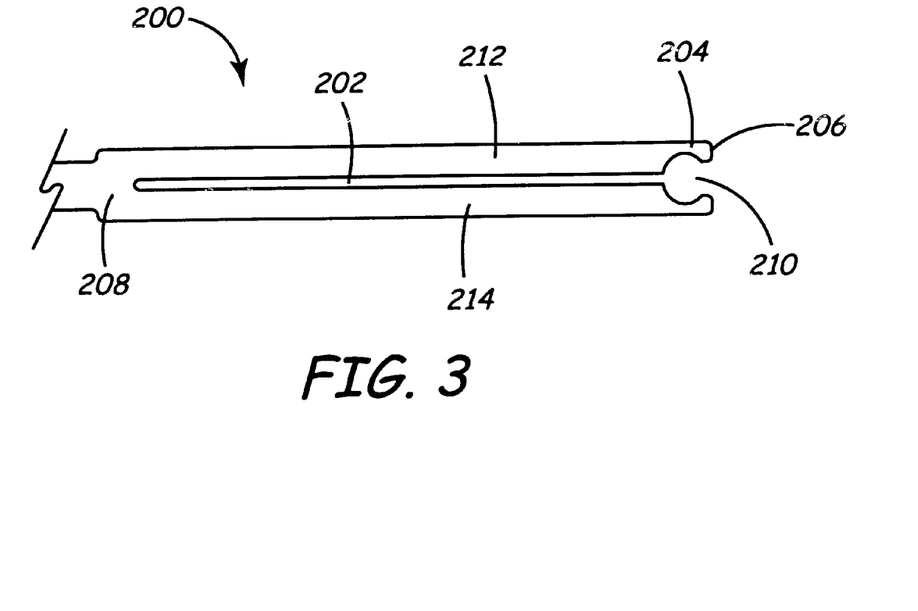
FIG. 3 is a side elevation view of a head mounting arm that is a component of a first embodiment of the present invention.

Turning now to FIG. 3, shown is a simplified side elevation view of a head mounting arm 200 made in accordance with a first embodiment of the head suspension mounting system of the present invention. Examination of the figure shows that the actuator head mounting arm 200 is divided by a horizontal slot 202 extending from a transverse mounting feature 204 near the distal end 206 of the actuator head mounting arm 200 back toward the proximal end 208 of the actuator head mounting arm 200, and that the entire actuator head mounting arm 200 also includes a transverse slot 210 at its distal end 206 through which the mounted head suspensions will extend, as will be discussed in more detail below.

Thus, the horizontal slot 202 can be thought of as dividing the actuator head mounting arm 200 into two separate cantilevered beam elements, or upper and lower spring elements 212, 214, the mechanical characteristics of which can be optimized to provide the desired amount of mounting force for the associated head suspensions, while not requiring the exertion of excessive stresses on the material of the actuator head mounting arm 200.

In a preferred implementation of the present invention, the horizontal slot 202 is formed in the actuator head mounting arm 200 by wire EDM (Electrical Discharge Machining) coincident with the forming of the transverse mounting feature 204 and the transverse slot 210 at the distal end 206 of the actuator head mounting arm. It has been shown that the use of a 0.10 mm (0.004 inch) EDM wire will suffice to produce a horizontal slot 202 of 0.13 mm (0.005 inch), and the depth dimension of the horizontal slot 202 and thickness of the upper and lower spring elements 212, 214 were determined using the following material and stress considerations, and the loading force of a typical head/head suspension assembly of the current technology.

Figure 4:
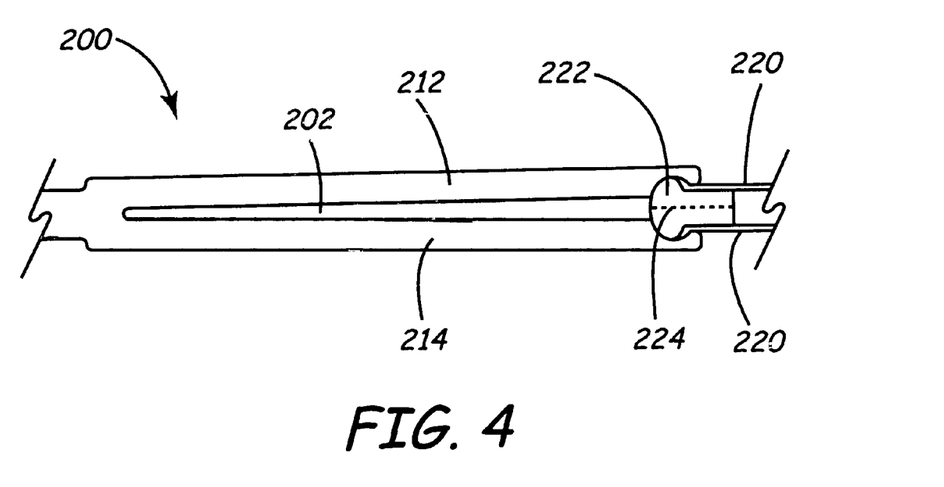
FIG. 4 is a side elevation view showing component relationships of the first embodiment of the present invention.

The manner in which the actuator head mounting arm 200 is utilized to mount a pair of head suspensions is shown in FIG. 4, which shows an actuator head mounting arm 200 with a pair of head suspensions 220. In this first embodiment of the invention, an attempt was made to eliminate the necessity of welding the head suspensions 220 to a mounting element. Thus, it is the intent of this embodiment to mount the head suspensions 220 through only the use of the spring force applied by the upper and lower spring elements 212, 214 against the head suspensions 220 themselves and an associated spacer element 222.

Examination of FIG. 4 shows that, in their intended mounting relationship, the upper and lower spring elements 212, 214 are bent slightly away from each other at the horizontal split 202 by the presence of the head suspensions 220 and spacer element 222. Details of the configuration of the transverse mounting feature (204 in FIG. 3) and the spacer element will be discussed below, but first a discussion of the determination of the dimensions of the horizontal slot 202 will be undertaken.

The material of the actuator head mounting arm 200 for the following analysis is assumed to be 6061-T6 aluminum alloy, with a Young's modulus of 69 Gpa (10,000,000 psi), and yield stress at 80° C. of 248 MPa (36,000 psi) (see Metals Handbook, 1960 edition, page 945).

Dimensional tolerance assumptions for the analysis are as follows:
EDM slot thickness tolerance=±0.010 mm (±0.0004 inch)
Spring element 212, 214 thickness tolerance=±0.005 mm (±0.0002 inch)
Spacer element 222 thickness tolerance=±0. 010 mm (±0.0004 inch).

Each of the spring elements 212, 214 will be subject to half of the slot tolerance noted. If the spacer element 222 is a single component, as shown in FIG. 4, then each spring elements 212, 214 will also be subject to half of the spacer 222 tolerance. If, however, each head suspension 220 were to be associated with an individual spacer element and paired in a back-to-back manner, as shown by dashed line 224 in FIG. 4, then each spring element 212, 214 would be subject to the entire spacer tolerance noted. To ensure worst case analysis, it will be assumed that two spacer elements 222, with individual tolerances noted for each, are included in the assembly.

The tolerance in the deflection of the tips of the spring elements 212, 214 is found by root-sum-square summation of the components, as follows:

$$T_d = \pm \sqrt{0.005^2 + 0.005^2 + 0.010^2}$$
$$= \pm 0.012 \text{ mm } (\pm 0.00048 \text{ inch})$$

It is further assumed that a typical head suspension of the current technology applies a preload of 4 gmf at a point 15.8 mm from the point of its base constraint, or the far distal end of the spacer 222 in FIG. 4. In an example embodiment, this point of base constraint is 0.5 mm from the point at which the spring elements 222, 214 clamp the spacer element 222. Summing moments at the end of the spacer element 222, the required clamping force to support the cited preload is found to be 126 gmf (1.24N).

It is also noted that a typical head/head suspension assembly of the current art has a total mass of about 65 mg. Thus, the head/head suspension assembly will have an inertia of about 65 gmf under shock acceleration loading of 1000 G, as is typically specified for disc drives of the current generation. If the coefficient of friction between the spring elements 222, 214 and the spacer element 222 is greater than 0.52, the head suspensions should not shift from their desired mounting attitude under the specified mechanical shock loads.

The stiffness required of the spring elements 222, 214 is defined such that they will provide the minimal required clamping force at the low end of the tolerance of spring element tip deflection. Selecting this low end of spring element tip deflection at 0.025 mm (0.001 inch), the stiffness required is 49,600 N/m. The nominal spring element tip deflection (i.e., the spring element tip deflection caused by interaction between spring elements 222, 214 thickness', head suspension 220 thickness' and spacer element 222 thickness that are all at their nominal dimensions) is 0.037 mm (0.0015 inch) and the maximum deflection (i.e., deflection of the tips of the spring elements 222, 214 caused by maximum interference caused by dimensional tolerances) is 0.049 mm (0.0019 inch). The clamping force applied by the spring elements 222, 214 to the spacer element 222 and head suspensions 220 ranges from a low of 1.24 N at the low end of spring element tip deflection, to 1.84 N nominally, to a maximum of 2.43 N at the high end of the tip deflection tolerance.

A useful equation for calculating the stiffness of a cantilevered beam of rectangular cross-section is:

$$K = \frac{F}{d} = \frac{Ewt^3}{4L^3}$$

where:

K=stiffness of spring element 212, 214=49,600 N/m
F=clamping force=1.84 N
d=spring element tip deflection=37 (m
E=Young's modulus=69 Gpa
w=width of the actuator head mounting arm=5.08 mm (0.200 inch)
t=beam thickness, in meters, and
L=beam length, in meters.

From this equation, an exemplary ratio of beam length to beam thickness is easily calculated as L/t=12.09.

A simple equation for calculation of stress at the root of a cantilever beam with rectangular cross-section is shown below, before and after substituting the example L/t ratio calculated above.

$$\sigma = \frac{6FL}{wt^2} = 72.5 \frac{F}{wt}$$

For a particular design stiffness, the stress at the root of the cantilever beam is inversely proportional to the beam thickness. A table of beam thickness' and resultant beam lengths and stresses is shown below. The stress figures assume beam tip deflection at the high end of the tolerance range, where the clamping force is 2.43 N.

TABLE 1

Hand Calculated Stress with Beam Length = 12.09 × Beam Thickness

| Beam Thickness | | Beam Length | | Stress at Root of Beam | |
| --- | --- | --- | --- | --- | --- |
| (mm) | (mil) | (mm) | (mil) | (Mpa) | (psi) |
| 0.33 | 13 | 4.0 | 157 | 105 | 15,231 |
| 0.38 | 15 | 4.6 | 181 | 91.3 | 13,227 |
| 0.43 | 17 | 5.2 | 205 | 80.7 | 11,689 |
| 0.48 | 19 | 5.8 | 228 | 72.3 | 10,471 |
| 0.53 | 21 | 6.4 | 252 | 65.4 | 9,483 |

From the table, it is apparent that the beam thickness of 0.43 mm results in a root stress only 32.5% of the yield strength (248 MPa) of the cited example material.

Having the two spring elements 222, 214 each with a thickness of 0.43 mm and a horizontal slot 202 therebetween of 0.13 mm produces an actuator head mounting arm 200 with an overall thickness at the proximal end (208 in FIG. 3) of the actuator head mounting arm of 0.99 mm (0.039 inch), which is comparable to actuator head mounting arm thickness' used in current disc drive products which incorporate swage mounting of the head suspensions. The assembled thickness of the transverse slot mounting system of the present invention provides a total thickness at the distal end of 0.042 inch, or 0.003 inch thicker than at the base of the actuator head mounting arm 200, due to tip deflection caused by component interferences necessary to provide the clamping force.

This increase in overall thickness at the distal end of the actuator head mounting arm 200 is compensated for by the reduced mass of the head suspension mounting system elements. For instance, it is envisioned that the single spacer element 222 shown in FIGS. 3 through 5 will have a mass substantially half of that of a pair of current technology swage mounting plates which would, in the prior art, be used to mount the pair of head suspensions 220. Since a primary consideration in establishing interdisc spacing is the amount of deflection at the actuator head mounting arm distal end as a response to a maximum specified shock, and since the present invention significantly reduces the mass carried at the distal end of the actuator head mounting arm, the head suspension mounting system of the present invention can be expected to produce significantly smaller tip deflections of the actuator head mounting arms in response to applied mechanical shocks. Thus, the present invention allows the use of the same interdisc spacing as did the prior art swage mounting, even though the overall thickness at the distal end of the actuator head mounting arm is increased.

The clamping stress was expected from experience to be larger than tabulated above, due to stress concentration at the small radius at the root of the horizontal slot 202. A 2-dimensional Ansys model was developed to obtain the stress concentration factor. The stress error due to mesh discretization was only 2.3% in this model. From the Ansys model, it was determined that stress concentration factor at the root of the horizontal slot is 1.84.

Figure 5:
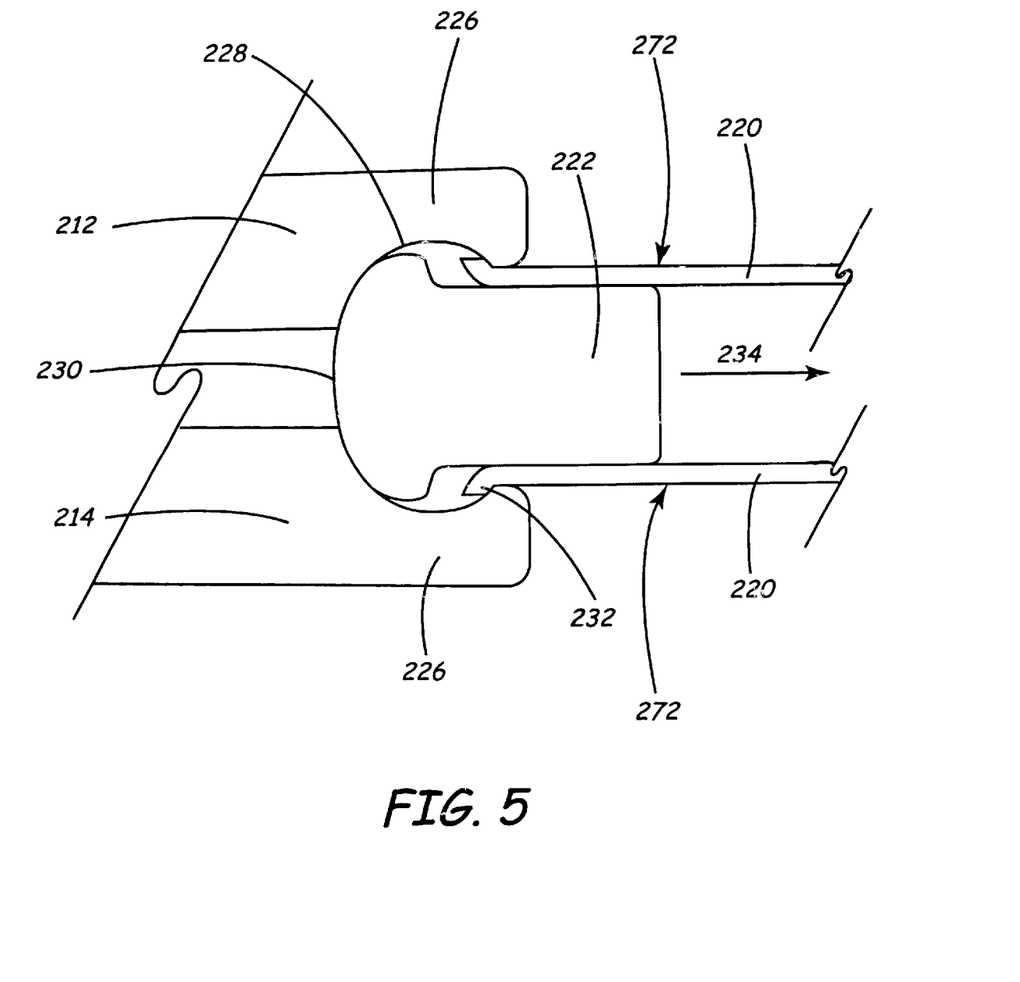
FIG. 5 is a detail view of a portion of FIG. 4.

Table 2 below shows clamping forces reduced about 10% from the hand calculations of Table 1. This reduction in clamping force is the result of the thinning of the spring elements 222, 214 in the clamping area, as can best be seen at 226 in FIG. 5. FIG. 5 is a detail view of the clamping portion of the head suspension mounting system, and can thus be considered to be a close-up view of the right side of FIG. 4. In FIG. 5, it can be seen that the thickness of the spring elements 222, 214 has been greatly reduced at positions designated by numerical reference 226 in order to accommodate the inclusion of the spacer element 222 and head suspensions 220.

TABLE 2

Stress at Root of Cantilever Beam 0.43 mm Thick × 5.2 mm Long

| | Clamping Force, N | | Stress at Root of Beam, MPa | |
| --- | --- | --- | --- | --- |
| Interference at Beam Tip, μm | Hand Calculated | Ansys | Hand Calculated | Ansys |
| 25 | 1.24 | 1.14 | 37.8 | 68.7 |
| 37 | 1.84 | 1.65 | 54.7 | 101 |
| 49 | 2.43 | 2.16 | 71.7 | 133 |

It has been shown that stress of about 75 MPa (10,900 psi) occurs at 226 when the spring elements 222, 214 are fully loaded to 49 μm of interference. Since this portion of the actuator head mounting arm may be partially annealed by the EDM process, it may be necessary to strengthen this portion of the spring elements 212, 214. Increasing the cross-section can be accomplished, for instance, by reducing the thickness of the spacer element 222. Alternatively, material modification, such as heat treating and precipitation hardening after the EDM process may be used to restore the strength of the material.

Returning for the moment to FIG. 5, it can be seen that this embodiment of the invention envisions that the transverse feature (204 in FIG. 3) is formed with a curved surface 228, while the spacer element 222 has a cooperative curved surface 230 with a smaller radius. It can also be seen that the extreme ends 232 of the head suspensions 220 have been formed for cooperative engagement with confronting surfaces of the transverse feature. Thus the interaction of the spring force of the spring elements 222, 214 acts in cooperation with the curvatures of the contacting surfaces 228, 230 to force the spacer element 222 in the direction shown by arrow 234, until contact is established between the curved end portions 232 of the head suspensions and the cooperative surfaces of the transverse feature, thereby establishing not only the longitudinal position of the head suspensions 220 along the axis parallel with arrow 234, but the rotational position of the head suspensions 220 as well.

Figure 6:
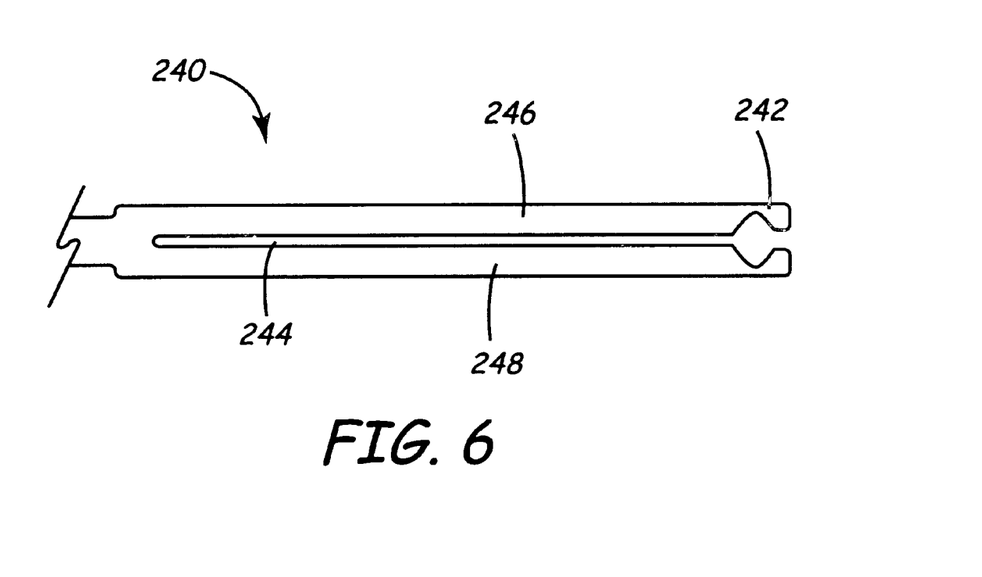
FIG. 6 is a side elevation view of a head mounting arm that is a component of a second embodiment of the present invention.

FIG. 6 shows a side elevation view of an actuator head mounting arm 240 that includes a transverse feature 242 having a second configuration. Once again, it can be seen in FIG. 6 that the actuator head mounting arm 240 is divided by a horizontal slot 244 into upper and lower spring, or cantilever beam, elements 246, 248.

Figure 7:
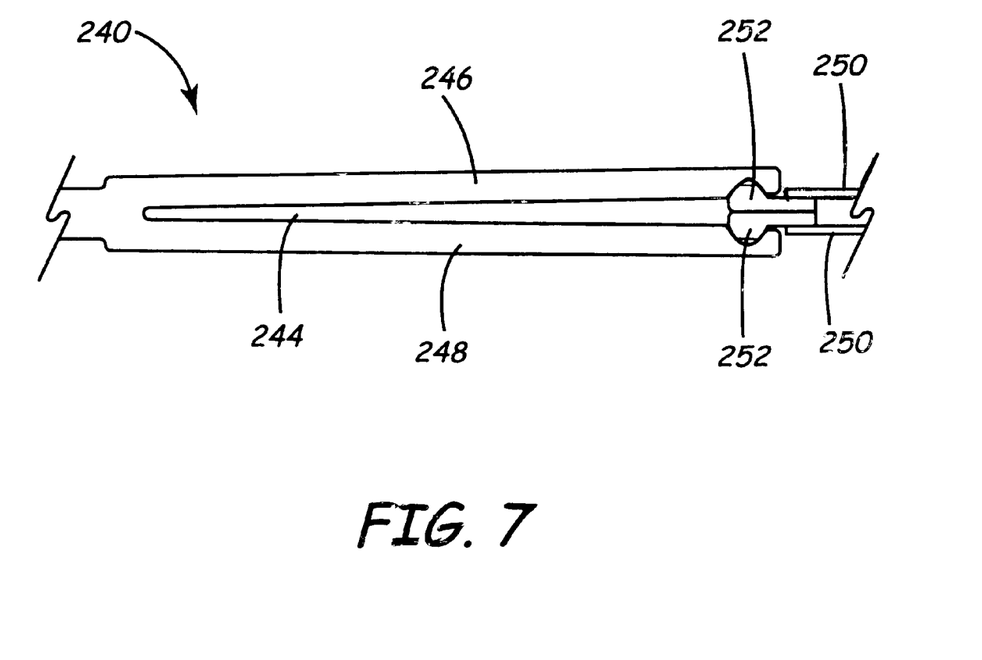
FIG. 7 is a side elevation view showing component relationships of the second embodiment of the present invention.

FIG. 7 shows a side elevation view of the actuator head mounting arm 240 of FIG. 6 in its loaded, or assembled, condition, in cooperation with a pair of head suspensions 250, which are welded to spacer elements 252. The spacer elements 252 include features for cooperation with the transverse feature (242 in FIG. 6) to facilitate proper alignment of the head suspensions 250, as will be discussed in detail below.

Figure 8:
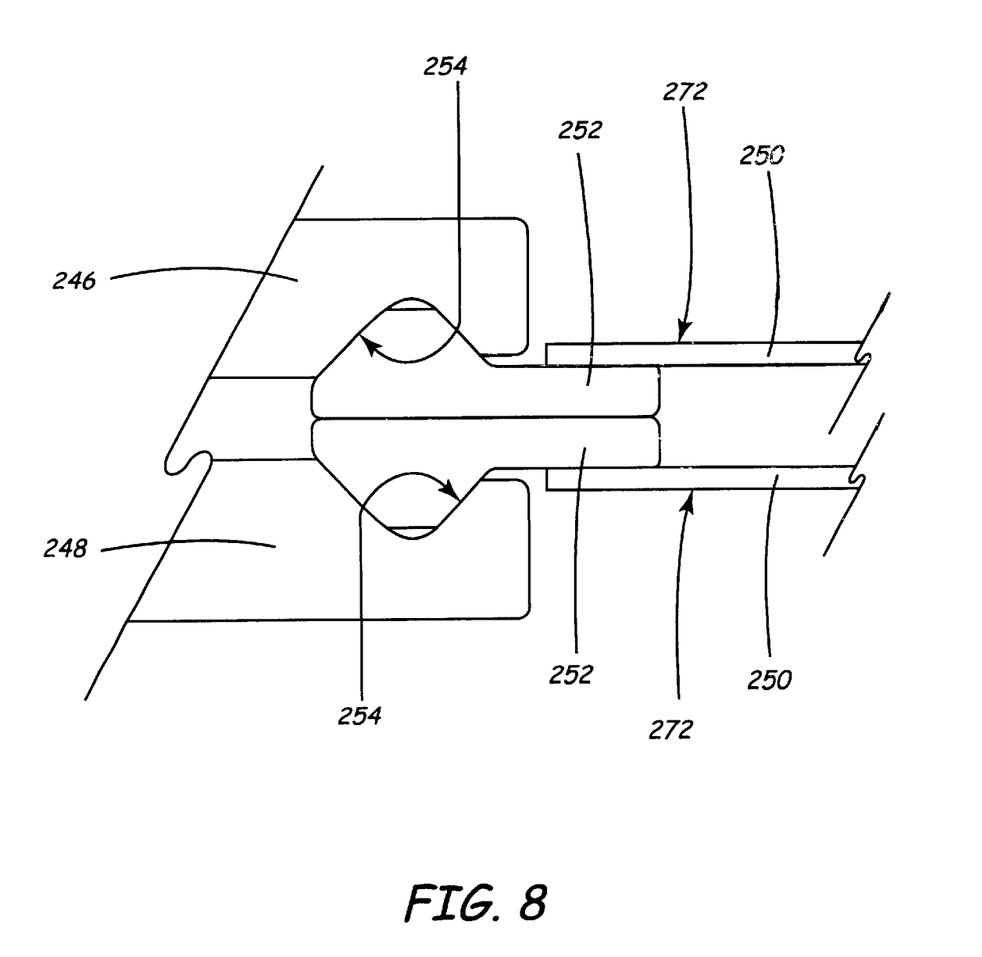
FIG. 8 is a detail view of a portion of FIG. 7.

FIG. 8 is a detail elevation view of the embodiment of the head suspension mounting system of the present invention shown in FIGS. 6 and 7.

Specifically, FIG. 8 shows that the transverse feature (242 in FIG. 6) of the upper and lower spring elements 246, 248 and the spacer elements 252 each have matching beveled contact surfaces 254. Thus, under the spring conditions brought about by the fitting of the spacer elements 252 into the transverse feature 242, the beveled contact surfaces 254 interact to properly position the head suspensions in the desired alignment with the actuator head mounting arm (240 in FIG. 6).

Figure 9:
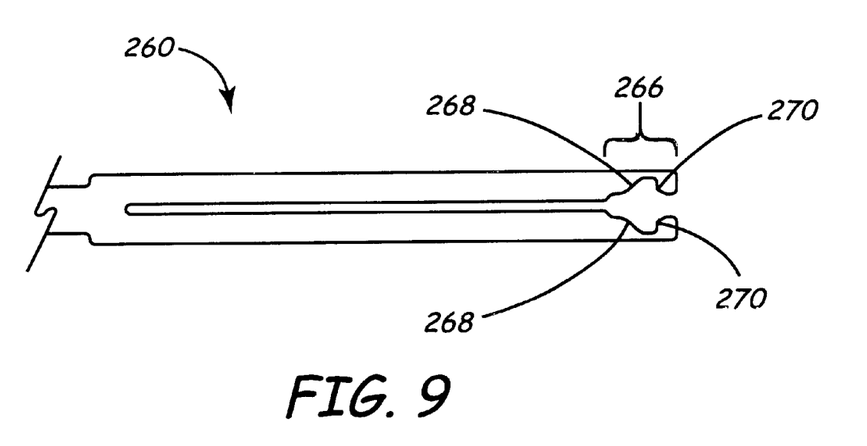
FIG. 9 is a side elevation view of a head mounting arm that is a component of a third embodiment of the present invention.
Figure 10:
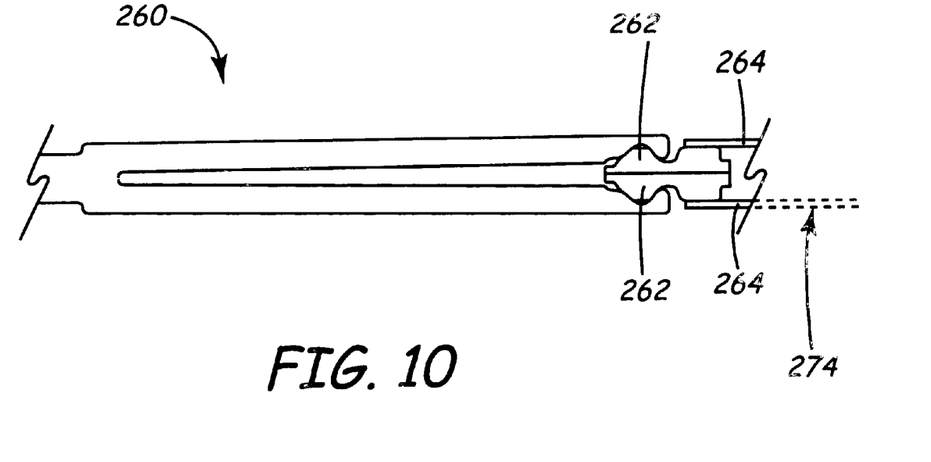
FIG. 10 is a side elevation view showing component relationships of the third embodiment of the present invention.

FIGS. 9 and 10 show, respectively, side elevation views of a third embodiment of an actuator head mounting arm 260, and the head mounting arm 260 in its loaded, or assembled, condition, in cooperation with appropriately configured spacer elements 262, to which are welded a pair of head suspensions 264.

The embodiment of FIGS. 9 and 10 differs from the previously described embodiments principally in the configuration of the transverse feature 266 in the distal end of the actuator head mounting arm 260 and in the cooperative features on the spacer elements 262. Examination of FIG. 9 shows that the transverse feature 266 includes a pair of beveled surfaces 268 and a pair of substantially vertical contact surfaces 270. The spring force developed when the paired spacer elements 262 are inserted into the transverse feature 266 causes the beveled surfaces 268 to bear against the cooperative surfaces on the spacer elements 262 and force the spacer elements 262, with the attached head suspensions 264, to the right in the figure, and consequently into intimate contact with the substantially vertical contact surfaces 270. Thus the embodiment of FIGS. 9 and 10 provides a more positive establishment of the longitudinal position of the head suspensions 264 relative to the actuator head mounting arm 260—and thus to the pivot axis of the actuator—than does either of the two previously described embodiments.

All of the embodiments of the present invention described to this point have shown an actuator head mounting arm (200, 240, 260) with a pair of head suspensions (220, 250, 264) mounted thereon. Such actuator head mounting arms can be found between each pair of adjacent discs in a disc drive, and will have head assemblies which cooperate with the lower surface of the disc located above the actuator head mounting arm, and with the upper surface of the disc located below the actuator head mounting arm.

When it is recalled that the head suspensions provide a spring force to cause the head assemblies to be encouraged toward the associated disc surface, it will be understood that such "middle" actuator head mounting arms are subjected to substantially balancing load forces, as represented by arrows 272 in FIGS. 5 and 8. That is, the application of balanced load forces on the head suspension mounting mechanisms of "middle" actuator head mounting arms acts in cooperation with the alignment features of the transverse features (204, 242, 266) and the spacer elements (222, 252, 262) to maintain the spacer elements and their associated head suspensions (220, 250, 264) in the desired flat attitude in relationship to the actuator head mounting arm.

However, it is well known in the industry to provide the uppermost actuator head mounting arm and the lowermost actuator head mounting arm in the vertical array of actuator head mounting arms with a single head suspension assembly each. This is because the uppermost actuator head mounting arm extends above the upper surface of the uppermost disc mounted on the spindle motor, and thus provides only a single head for cooperation with this uppermost disc surface. A similar situation obtains with the lowermost disc surface and actuator head mounting arm in a disc drive.

The result of such a single head suspension being mounted on an actuator head mounting arm is that the preload force generated by the spring portion of the head suspension is unbalanced, as represented by the single vector arrow 274 in FIG. 10, which acts to rotate the spacer element within the transverse feature of the actuator head mounting arm, counterclockwise in the case shown in FIG. 10, and clockwise for a similar arrangement with a single head suspension mounted on the upper side of the actuator head mounting arm, as would be the case for the lowermost actuator head mounting arm in a disc drive. Obviously, this tendency to rotate the spacer element within the transverse feature of the actuator head mounting arm is undesirable, since it can lead to misalignment of the head suspension and disc surface, and uncontrolled loading of the head assembly, which, in turn, produces a loss of control of the flying height of the head assembly relative to the disc. Therefore, special configurations of the uppermost and lowermost actuator head mounting arms in a disc drive may have to be provided.

Figure 11:
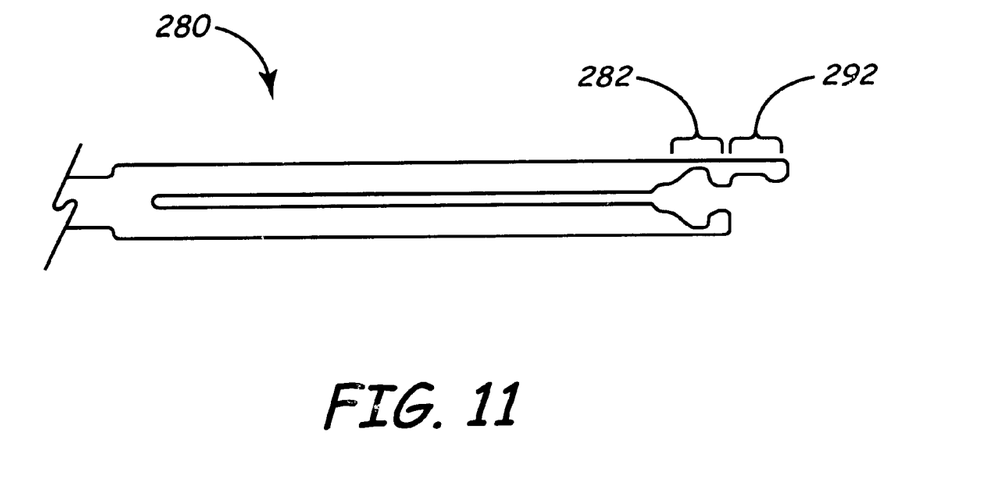
FIG. 11 is a side elevation view of a head mounting arm, similar to the third embodiment of FIGS. 9 and 10, that shows a first special adaptation of the configuration of a head mounting arm for mounting a topmost head suspension in a disc drive.
Figure 12:
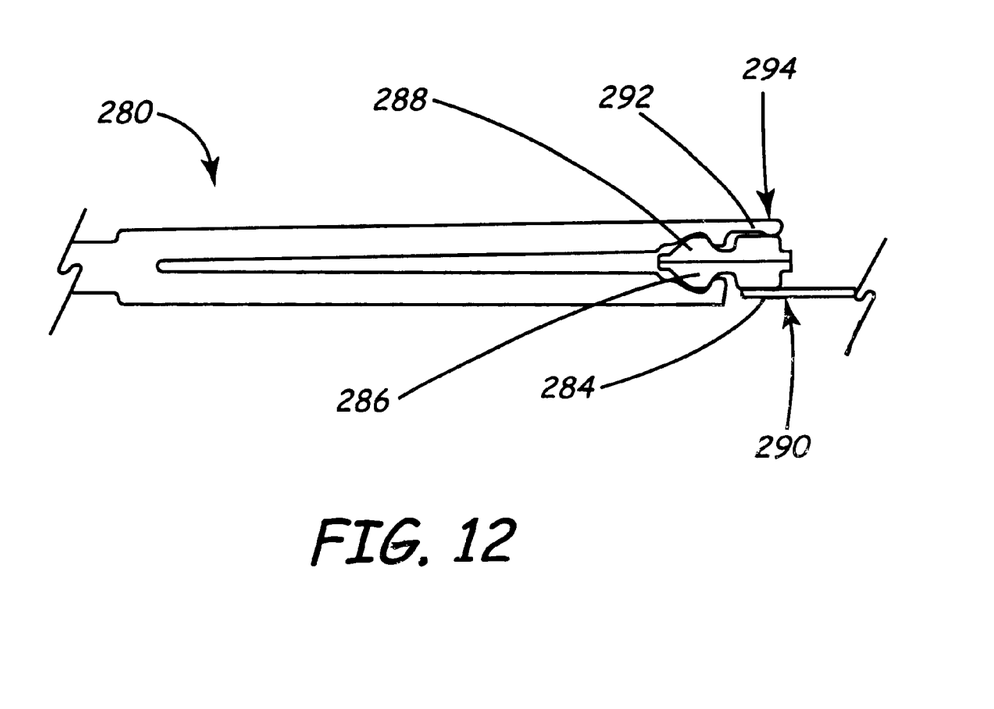
FIG. 12 is a side elevation view showing a single head suspension mounted to the head mounting arm of FIG. 11.

FIG. 11 shows a specially configured uppermost actuator head mounting arm 280, which includes a transverse feature 282 similar to that of the embodiments of FIGS. 9 and 10. The uppermost actuator head mounting arm 280 mounts a single head suspension 284, as shown in FIG. 12, which is welded to a spacer element 286. A dummy spacer element 288, which does not include an attached head suspension, is also included in the configuration. One of skill in the art will appreciate that the spacer element 286 and dummy spacer element 288 can be fabricated as a single unitary part. Such a unique component, however, would result in head/head suspension assemblies suitable only for use on a properly configured uppermost actuator head mounting arm, along with associated inventory control and production control difficulties.

With this configuration of components, the load force of the head suspension 284 applies a force directed substantially in the direction of arrow 290 against the elements of the head suspension mounting system. Such a force tends to rotate the head suspension counterclockwise, and this tendency must be countered, as noted above, to prevent degradation of the load force applied to the associated head assembly.

In order to balance the load force of the single head suspension 284, the uppermost actuator head mounting arm 280 includes, on the upper spring element, a specially configured beam extension 292 that extends beyond the mounting features of the transverse feature 282 and bears against the upper surface of the dummy spacer element 288. This causes a balancing force to be exerted in the direction of arrow 294. The shape of the beam extension 292 can be accomplished during the same EDM process used to define the other features of the uppermost actuator head mounting arm 280.

If the beam extension is strong enough and long enough, the balancing force 294 will be sufficient to counter the load force 290 of the head suspension 284, and maintain the head suspension 284 in its desired relationship with the uppermost actuator head mounting arm 280. One of skill in the art will appreciate that, if FIGS. 11 and 12 were vertically inverted, an appropriate actuator head mounting arm for the lowermost head suspension in the disc drive would be provided.

This configuration of elements does present certain drawbacks, however. First is the necessity of including a dummy spacer element 288, which involves additional parts count and processing complications. Secondly, the necessity of thinning the beam extension 292 to ensure localized application of the balancing force 294 can result in a beam extension 292 which is itself subject to deformation under the designed force application. A better solution was, therefore, developed.

Figure 13:
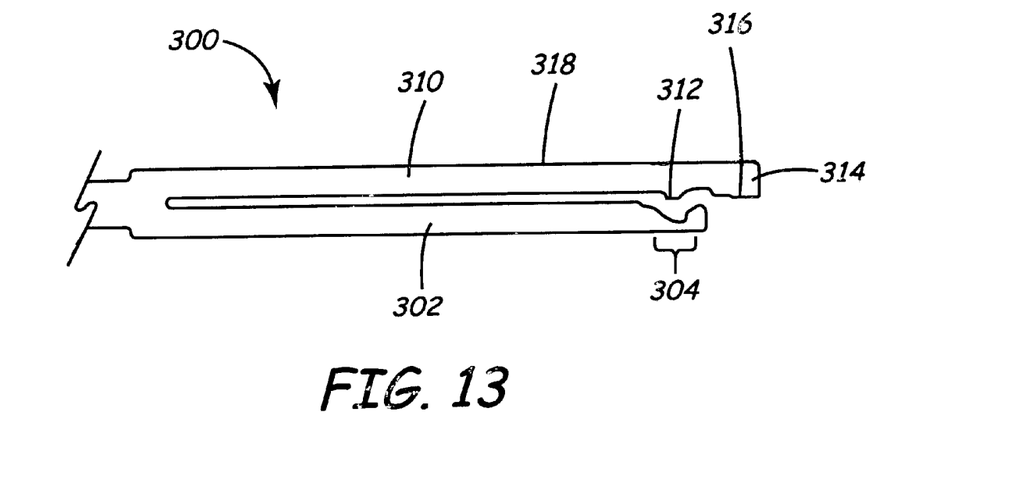
FIG. 13 is a side elevation view of a head mounting arm, similar to the third embodiment of FIGS. 9 and 10, that shows a second special adaptation of the configuration of a head mounting arm for mounting a topmost head suspension in a disc drive.

FIG. 13 shows a side elevation view of a second variation of an uppermost actuator head mounting arm 300. Again, the lower spring element 302 can be seen to include a transverse feature 304 similar to the embodiments of FIGS. 9 and 10.

Figure 14:
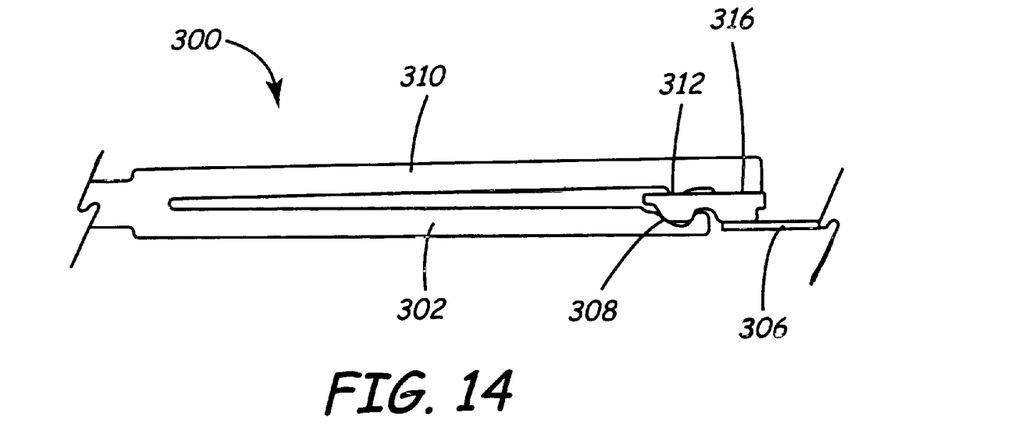
FIG. 14 is a side elevation view showing a single head suspension mounted to the head mounting arm of FIG. 13.

FIG. 14 shows the uppermost actuator head mounting arm 300 of FIG. 13 in association with other cooperative head suspension mounting elements. Specifically, FIG. 14 shows a single head suspension 306 welded to a single spacer element 308.

The upper spring element 310 of the uppermost actuator head mounting arm 300 can be seen to include a first contact surface 312, which bears against the upper surface of the spacer element 308 at a position opposite to the transverse feature (304 in FIG. 13), and a beam extension 314, which includes a second contact surface 316, which contacts the upper surface of the spacer element 308 at a location opposite the attached head suspension 306. The first and second contact surfaces 312, 316 can be formed by the same EDM process used to define other elements of the uppermost actuator head mounting arm 300. It is also envisioned by this embodiment of the invention that the first and second contact surfaces 312, 316 will be formed out of parallel with the uppermost surface 318 of the upper spring element 310, such that, when the assembly of the spacer element 308 into the transverse feature 304 is accomplished, both the first and second contact surfaces 312, 316 will lie flat against the upper surface of the spacer element 308.

The embodiment of FIGS. 13 and 14 has several advantages: 1) there is no need to include a dummy spacer element, such as that designated with numerical reference 288 in FIG. 12, thus reducing part count and simplifying assembly; 2) head/head suspension assemblies usable with the specially configured uppermost actuator head mounting arm 300 of FIGS. 13 and 14 can also be used in corresponding locations on "middle" actuator head mounting arms, such as that shown by numerical reference 260 in FIGS. 9 and 10; and 3) since there is no necessity to provide vertical space for a dummy spacer element, the beam extension 314 can be thicker, and, therefore, stronger than the beam extension 292 in the embodiments of FIGS. 11 and 12.

Once again, it will apparent to one of skill in the art that the configuration of FIGS. 13 and 14 will be usable for a lowermost actuator head mounting arm, if only vertically inverted.

From the foregoing, it is apparent that the present invention is particularly well suited to provide the benefits set forth hereinabove as well as others inherent therein. While particular embodiments of the invention have been described herein, modifications to the embodiments which fall within the envisioned scope of the invention may suggest themselves to one of skill in the art who reads this disclosure. Therefore, the scope of the invention should be considered to be limited only by the following claims.

What is claimed is:

1. A head suspension mounting system for a disc drive comprising:

a head mounting arm, including a transverse feature closely adjacent a distal end of the head mounting arm;

a transverse slot communicating between the transverse feature and a distal surface of the head mounting arm; and a horizontal slot extending from the transverse feature away from the distal end of the head mounting arm and serving to divide the head mounting arm into upper and lower spring elements;

a spacer element having second transverse features for cooperative engagement with the transverse feature of the head mounting arm; and a pair of head suspensions having third transverse features at their proximal ends for cooperative engagement with the transverse feature of the head mounting arm;

the head suspensions and the spacer element being laterally inserted into the distal end of the head mounting arm so as to form an interference fit between the transverse feature of the head mounting arm, the spacer element and the head suspensions;

the upper and lower spring elements providing a clamping force to maintain the head suspensions in a fixed position relative to the head mounting arm.

2. The head suspension mounting system of claim 1 wherein:

the spacer element comprises a curved surface facing away from the distal end of the head mounting arm; and the transverse feature of the head mounting arm comprises curved surfaces on the upper and lower spring elements which engage respective portions of the curved surface on the spacer element.

3. The head suspension mounting system of claim 2 wherein the curved surface on the spacer element and the curved surfaces on the upper and lower spring elements are oriented such that the clamping force forces the spacer element in a direction toward the distal end of the head mounting arm, thereby engaging the third transverse features on the pair of head suspensions against the transverse feature of the head mounting arm.

4. The head suspension mounting system of claim 1 wherein the third transverse features on the proximal ends of the head suspensions each comprise a transversely extending curved end portion that engages the transverse feature on the head mounting arm.

5. A head suspension mounting system for a disc drive comprising:
   a head mounting arm, including a transverse feature closely adjacent a distal end of the head mounting arm;
   a transverse slot communicating between the transverse feature and a distal surface of the head mounting arm; and
   a horizontal slot extending from the transverse feature away from the distal end of the head mounting arm and serving to divide the head mounting arm into upper and lower spring elements;
   a spacer element having second transverse features for cooperative engagement with the transverse feature of the head mounting arm; and
   a pair of head suspensions welded to the spacer element;
   the spacer element being laterally inserted into the distal end of the head mounting arm so as to form an interference fit between the transverse feature of the head mounting arm and the spacer element;
   the upper and lower spring elements providing a clamping force to maintain the spacer element in a fixed position relative to the head mounting arm.

6. The head suspension mounting system of claim 5 wherein:
   the spacer element comprises first and second spacer elements which are placed in an adjacent back-to-back relationship and are laterally inserted into the distal end of the head mounting arm so as to form the interference fit between the transverse feature of the head mounting arm and the first and second spacer elements; and
   each of the head suspensions in the pair of head suspensions are attached to a respective one of the first and second spacer elements.

7. The head suspension mounting system of claim 5 wherein:
   the second transverse features of the spacer element comprise upper and lower beveled surfaces, which engage corresponding beveled surfaces on the upper and lower spring elements.

8. A head suspension mounting system for a disc drive comprising:
   a head mounting arm, including a transverse feature closely adjacent a distal end of the head mounting arm;
   a transverse slot communicating between the transverse feature and a distal surface of the head mounting arm; and
   a horizontal slot extending from the transverse feature away from the distal end of the head mounting arm and serving to divide the head mounting arm into upper and lower spring elements;
   a pair of spacer elements each having second transverse features for cooperative engagement with the transverse feature of the head mounting arm; and
   a pair of head suspensions each welded to one of said pair of spacer elements;
   the spacer elements being placed into adjacent back-to-back relationship and laterally inserted into the distal end of the head mounting arm so as to form an interference fit between the transverse feature of the head mounting arm and the spacer elements;
   the upper and lower spring elements providing a clamping force to maintain the spacer elements in a fixed position relative to the head mounting arm.

9. The head suspension mounting system of claim 8 wherein each of the spacer elements in the pair comprises:
   at least one beveled surface which engages a corresponding beveled surface on a respective one of the upper and lower spring elements.

10. A head suspension mounting system for mounting a single head suspension to a head mounting arm in a disc drive comprising:
   a horizontal slot dividing the head mounting arm into upper and lower spring elements;
   transverse features closely adjacent distal ends of the upper and lower spring elements;
   a spacer element including second transverse features for cooperation with the transverse feature in a first of the upper and lower spring elements;
   a dummy spacer including third transverse features for cooperation with the transverse feature in a second of the upper and lower spring elements;
   the second of the upper and lower spring elements further comprising a beam extension which extends distally beyond the distal end of the first of the upper and lower spring elements;
   the head suspension being welded to the spacer element;
   the spacer element and the dummy spacer being placed into adjacent back-to-back relationship and laterally inserted into cooperative engagement with the transverse features on the upper and lower spring elements, with the beam extension bearing against the dummy spacer;
   the upper and lower spring elements providing a clamping force to maintain the spacer element and the dummy spacer in fixed positions relative to the head mounting arm.

11. The head suspension mounting system of claim 10 wherein the second transverse features on the spacer element and the third transverse features on the dummy spacer element each comprises:
   at least one beveled surface which engages a corresponding beveled surface on a respective one of the upper and lower spring elements.

12. A head suspension mounting system for mounting a single head suspension to a head mounting arm in a disc drive comprising:
   a horizontal slot dividing the head mounting arm into upper and lower spring elements;
   transverse features closely adjacent a distal end of a first of the upper and lower spring elements;
   a spacer element having a first side including second transverse features for cooperation with the transverse features in the first of the upper and lower spring elements;
   a second of the upper and lower spring elements further comprising a beam extension which extends distally beyond the distal end of the first of the upper and lower spring elements;
   the head suspension being welded to the spacer element;

the spacer element being laterally inserted between the upper and lower spring elements such that the second transverse features on the first side of the spacer are brought into cooperative engagement with the transverse features on the first of the upper and lower spring elements, with the beam extension bearing against a second side of the spacer element opposite the first side;

the upper and lower spring elements providing a clamping force to maintain the spacer element in a fixed position relative to the head mounting arm.

13. The head suspension mounting system of claim 12 wherein the second transverse features on the spacer element comprise:

at least one beveled surface which engages a corresponding beveled surface on the first of the upper and lower spring elements.

14. A head suspension mounting system comprising:

a head mounting arm, including a transverse feature closely adjacent a distal end of the head mounting arm;

a transverse slot communicating between the transverse feature and the distal end of the head mounting arm;

a horizontal slot extending from the transverse feature away from the distal end of the head mounting arm and serving to divide the head mounting arm into upper and lower spring elements;

a spacer element having second transverse features for cooperative engagement with the transverse feature of the head mounting arm, wherein the spacer element is laterally inserted into the distal end of the head mounting arm so as to form an interference fit between the transverse feature of the head mounting arm and the spacer element, and wherein the upper and lower spring elements provide a clamping force to maintain the spacer element in a fixed position relative to the head mounting arm; and at least one head suspension supported by the spacer element relative to the head mounting arm.

15. The head mounting system of claim 14 wherein:

the head suspension comprises a proximal end having a transverse feature that cooperatively engages with the transverse feature of the head mounting arm; and the spacer element and the head suspension are laterally inserted into the distal end of the head mounting arm so as to form an interference fit between the transverse feature of the head mounting arm, the spacer element and the head suspension.

16. The head mounting system of claim 14 wherein the head suspension is attached to the spacer element externally to the transverse feature of the head mounting arm.

17. The head mounting system of claim 14 wherein:

the spacer element comprises first and second spacer elements which are placed in an adjacent back-to-back relationship and are laterally inserted into the distal end of the head mounting arm so as to form the interference fit between the transverse feature of the head mounting arm and the first and second spacer elements; and the head suspension is attached to a respective one of the first and second spacer elements.

18. The head mounting system of claim 17 and further comprising a further head suspension assembly attached to the other of the first and second spacer elements.

19. The head mounting system of claim 14 wherein:

the spacer element comprises first spacer element engaging the transverse feature in a first of the upper and lower spring elements and a dummy spacer element engaging the transverse feature in a second of the upper and lower spring elements;

the head suspension is attached to the first spacer element;

the second of the upper and lower spring elements comprises a beam extension which extends distally beyond the distal end of the first of the upper and lower spring elements and bears against the dummy spacer element; and the first spacer element and dummy spacer elements are placed in an adjacent back-to-back relationship and are laterally inserted into the distal end of the head mounting arm so as to form the interference fit between the transverse feature of the head mounting arm.

20. The head mounting system of claim 14 wherein:

the spacer element comprises a first side including
the second transverse features for cooperative engagement with the transverse features on a first of the upper and lower spring elements formed in the head mounting arm;

a second of the upper and lower spring elements comprises a beam extension which extends distally beyond the distal end of the first of the upper and lower spring elements, wherein the beam extension bears against a second side of the spacer element, which is opposite to the first side; and the head suspension is attached to the spacer element.

* * * * *